(12) United States Patent
Inokura et al.

(10) Patent No.: US 9,810,565 B2
(45) Date of Patent: Nov. 7, 2017

(54) OIL LEVEL GAUGE DEVICE

(71) Applicant: VOLVO TRUCK CORPORATION, Gothenburg (SE)

(72) Inventors: Minoru Inokura, Ageo (JP); Kiyonori Ide, Ageo (JP); Yuki Yamazaki, Ageo (JP)

(73) Assignee: Volvo Truck Corporation, Gothenburg (SE)

( * ) Notice: Subject to any disclaimer, the term of this patent is extended or adjusted under 35 U.S.C. 154(b) by 211 days.

(21) Appl. No.: 14/743,972

(22) Filed: Jun. 18, 2015

(65) Prior Publication Data

US 2015/0285668 A1 Oct. 8, 2015

Related U.S. Application Data

(63) Continuation of application No. PCT/JP2013/058629, filed on Mar. 25, 2013.

(30) Foreign Application Priority Data

Dec. 19, 2012 (JP) ................... 2012-277470

(51) Int. Cl.
*G01F 23/04* (2006.01)
(52) U.S. Cl.
CPC .................... *G01F 23/04* (2013.01)
(58) Field of Classification Search
CPC ....................................................... G01F 23/04

(Continued)

(56) References Cited

U.S. PATENT DOCUMENTS 1,658,774 A * 2/1928 Taub ...................... G01F 23/04
116/227
1,864,138 A * 6/1932 Machonis ............... G01F 23/04
220/302

(Continued)

FOREIGN PATENT DOCUMENTS

CN 101714449 A 5/2010
JP S60-023731 2/1985

(Continued)

OTHER PUBLICATIONS

International Preliminary Report on Patentability dated Jul. 2, 2015, which issued in PCT/JP2013/058629; and English language translation thereof.

(Continued)

*Primary Examiner* — Christopher Fulton
(74) *Attorney, Agent, or Firm* — McDermott, Will & Emery LLP

(57) ABSTRACT

An oil level gauge device in which an oil level gauge is inserted in a guide pipe communicating with an oil pan, is provided. In the oil level gauge, a cap having a plug configured to fit on an inner peripheral surface at one end portion of the guide pipe, and a flange integrally formed with the plug and abutted with the one end of the guide pipe, is provided. A groove extending from a deeply inserted side of the plug to an abutment surface of the end abutting the flange is formed in the inner peripheral surface. When the plug is fitted on the inner peripheral surface, a ventilation passage for communicating the inside and outside of the oil pan through the guide pipe is formed between the plug and the guide pipe by the groove.

14 Claims, 14 Drawing Sheets

(58) Field of Classification Search
USPC .......................................................... 33/727
See application file for complete search history.

(56) References Cited

U.S. PATENT DOCUMENTS

| | | | | |
|---|---|---|---|---|
| 2,239,402 | A | | 4/1941 | Sachs |
| 2,757,647 | A | * | 8/1956 | Kishline ................ F01M 11/04 220/86.2 |
| 2,953,939 | A | * | 9/1960 | Rains .................... F15B 21/005 123/41.86 |
| 3,377,708 | A | * | 4/1968 | Gassman ............... B65D 90/34 33/727 |
| 3,594,906 | A | * | 7/1971 | Kerfoot .................. G01F 23/04 33/717 |
| 4,067,113 | A | * | 1/1978 | Haines ................... G01F 23/04 33/727 |
| 4,596,141 | A | * | 6/1986 | Kondo .................. G01F 23/241 33/722 |
| 5,022,495 | A | * | 6/1991 | Lavender ............... F01M 11/04 184/1.5 |
| 5,086,943 | A | * | 2/1992 | Poskie ................ B65D 51/1622 220/303 |
| 6,279,247 | B1 | * | 8/2001 | Neitzel ................... E02F 9/006 137/493.4 |
| 8,272,140 | B2 | * | 9/2012 | Goldstein .............. G01F 23/04 33/725 |

FOREIGN PATENT DOCUMENTS

| | | |
|---|---|---|
| JP | 04-069609 U | 6/1992 |
| JP | 06-058325 U | 8/1994 |
| JP | 2671995 B2 | 11/1997 |
| JP | 2002-013406 A | 1/2002 |
| WO | WO-2012/091190 A1 | 7/2012 |

OTHER PUBLICATIONS

Extended European Search Report dated Jul. 15, 2016, which issued in European Application No. 13865957.8.
Japanese Office Action dated Nov. 10, 2015 which issued in Japanese Application No. 2014-552950 and its English language translation.
Chinese Office Action from Chinese Patent Application No. 201380065794.3, dated Apr. 26, 2017.

* cited by examiner

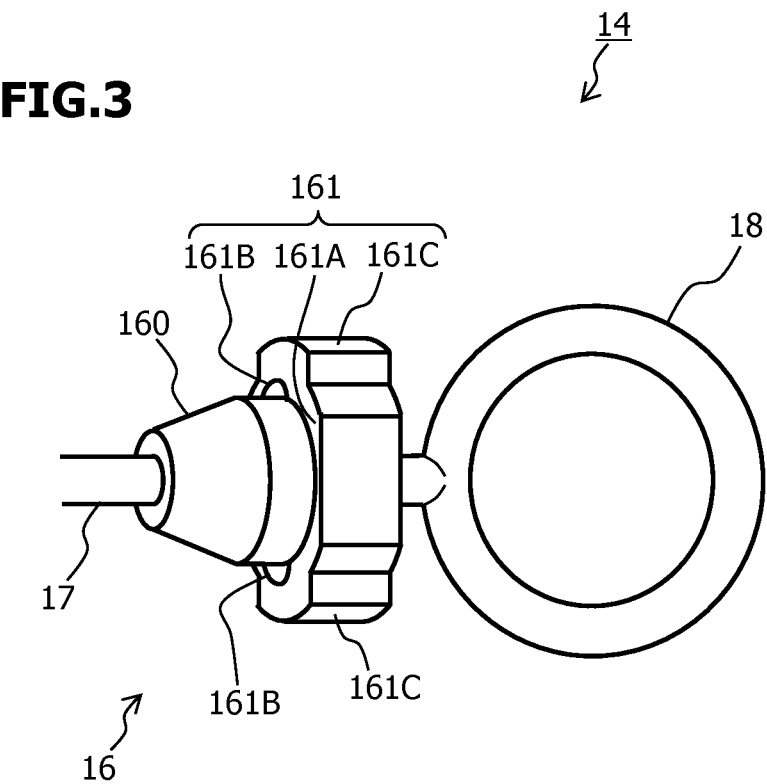

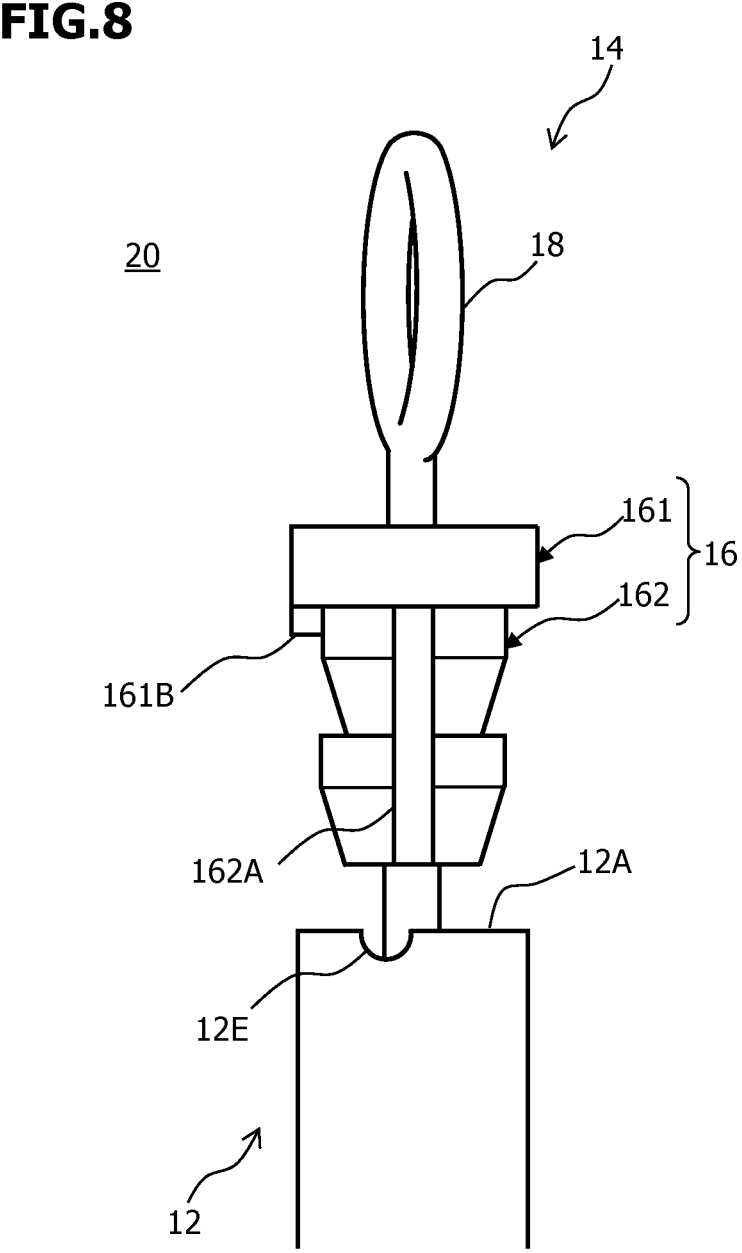

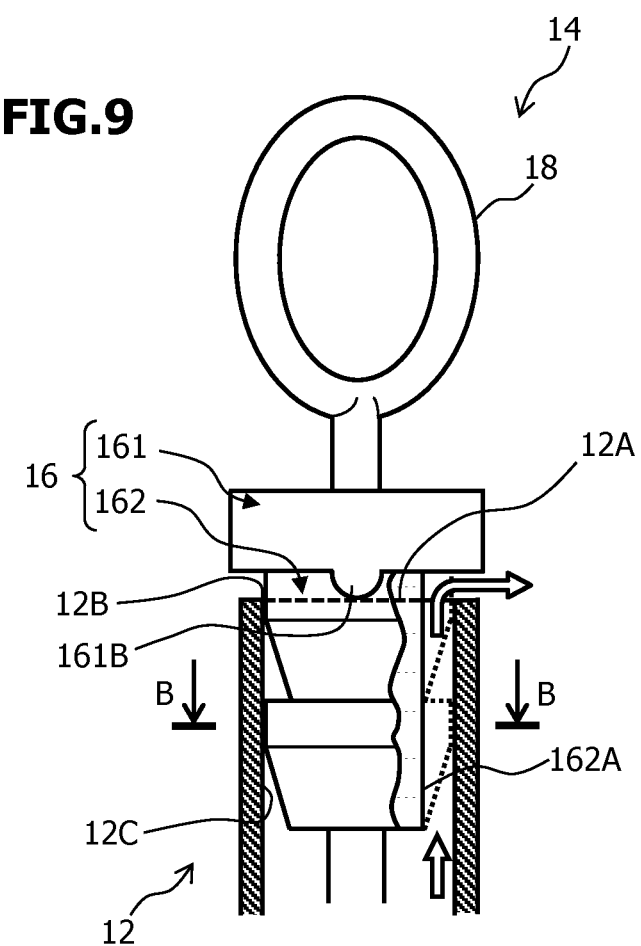

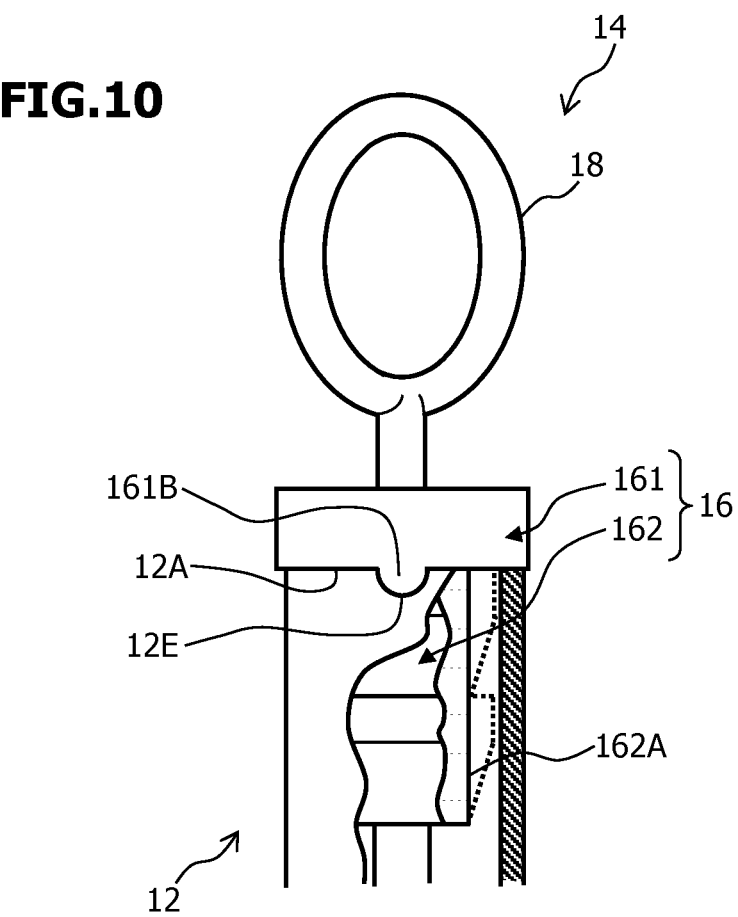

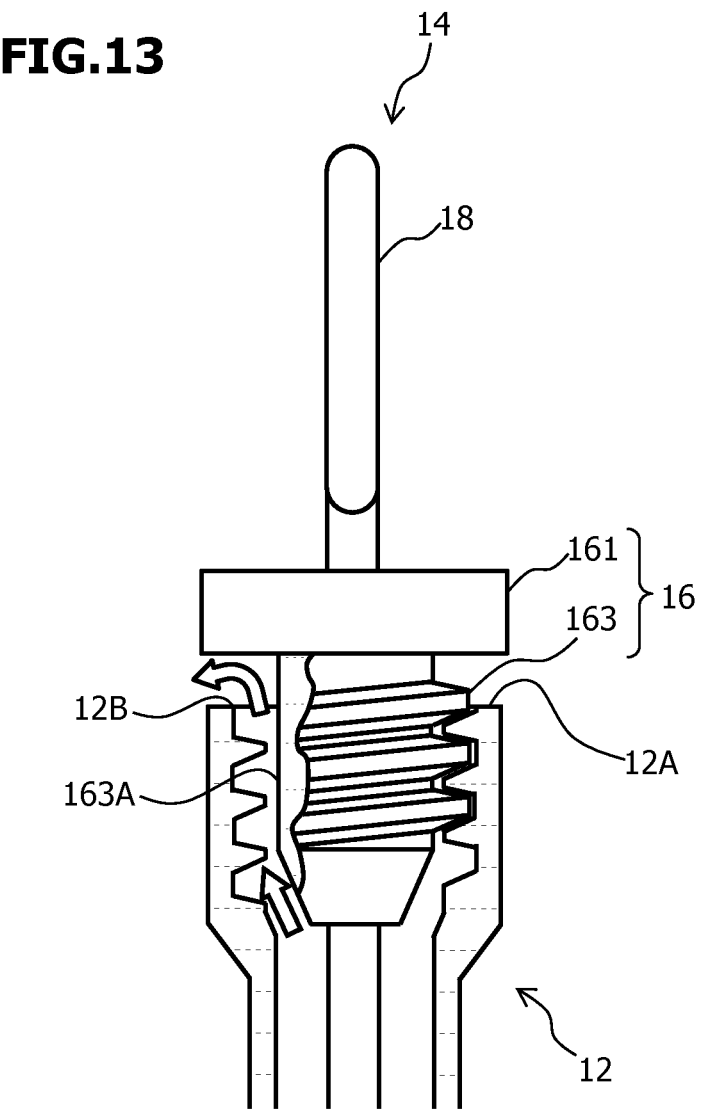

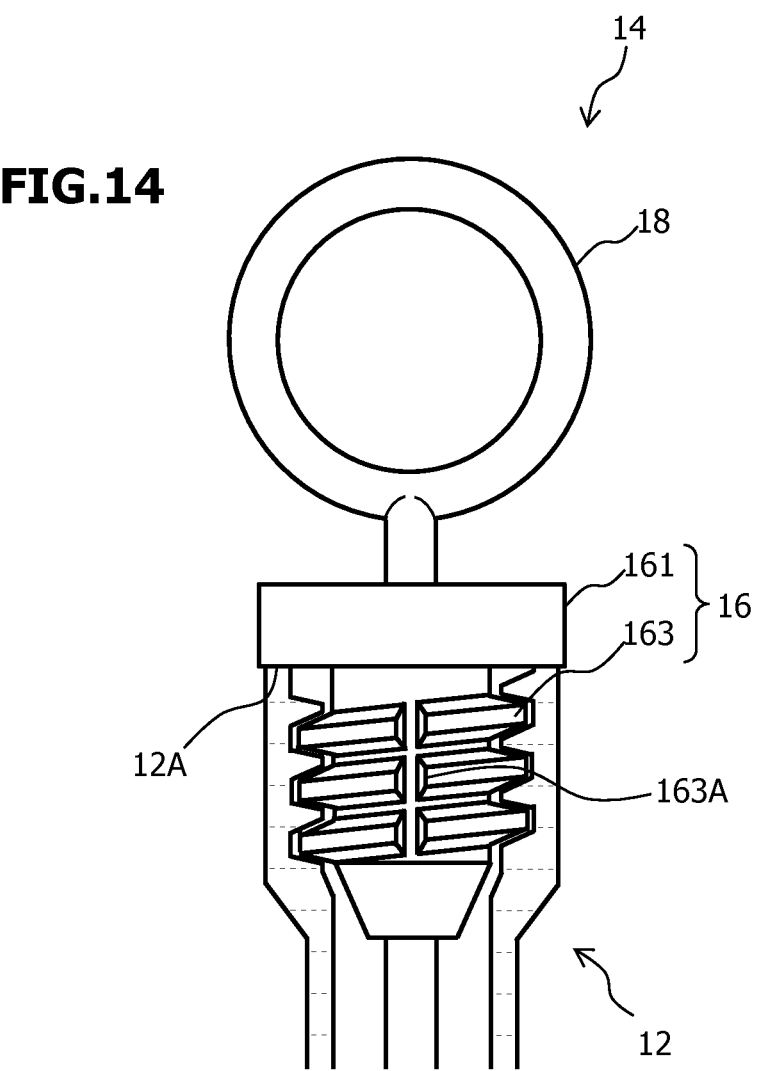

OIL LEVEL GAUGE DEVICE

CROSS-REFERENCE TO RELATED APPLICATION

This application is a continuation application of PCT/JP2013/058629, filed on Mar. 25, 2013, which is hereby incorporated by reference in its entirety for all purposes.

BACKGROUND OF THE INVENTION

1. Field of the Invention

The present invention relates to an oil level gauge device.

2. Description of Related Art

As an oil level gauge device, there is known one in which, into a guide pipe having one end that is open and the other end that is in communication with an oil pan, a tip portion of an oil level gauge having a base end to which a plug is attached, is inserted from the open end of the guide pipe, and the plug is fitted on an inner peripheral surface of the guide pipe at one end portion thereof to block ventilation between the inside and outside of the oil pan through the opening (refer to, for example, Japanese Utility Model Application Laid-Open Publication No. H06-058325).

There is, however, a concern that when the plug is fitted on the inner peripheral surface at one end portion of the guide pipe, air in the guide pipe, and by extension air in the oil pan, is compressed to press down an oil surface, thereby causing difficulty in accurately measuring the amount of oil stored in the oil pan.

SUMMARY OF THE INVENTION

Therefore, the present invention aims to provide an oil level gauge device capable of accurately measuring the amount of oil stored in an oil pan in view of such hitherto known problems as described above.

Therefore, an oil level gauge device according to an aspect of the present invention is an oil level gauge device including a cylindrical tube-like guide pipe having one end provided with an opening and the other end in communication with an oil pan, and an oil level gauge configured to be inserted in the guide pipe. A cap having a plug configured to fit on an inner peripheral surface of the guide pipe at one end portion thereof, and a flange that is integrally formed with the plug on the side opposite to the oil pan side of the plug fitted thereon, and that is configured to abut with the one end of the guide pipe, is provided at a base end of the oil level gauge. When the plug is fitted on the inner peripheral surface at the one end portion of the guide pipe, and the flange is not brought into abutment with the one end, a ventilation passage for communicating the inside and outside of the oil pan through the opening is formed between the plug and the guide pipe.

According to the embodiment of the present invention, it is possible to accurately measure the amount of oil stored in the oil pan.

BRIEF DESCRIPTION OF THE DRAWINGS

FIG. 3 is a perspective view illustrating details on a base end of an oil level gauge;

FIG. 8 is a side view of an oil level gauge device according to a second embodiment;

FIG. 9 is an axial partially sectional view in a state in which a convex portion and one end are brought into abutment with each other;

FIG. 10 is a side view illustrating a state in which a flange and one end are brought into abutment with each other;

FIG. 13 is an axial partially sectional view illustrating a state in which a plug and a guide pipe are threadedly engaged; and FIG. 14 is an axial partially sectional view illustrating a state in which a flange and one end are brought into abutment with each other.

DESCRIPTION OF PREFERRED EMBODIMENTS

The present invention will hereinafter be described in detail with reference to the accompanying drawings.

Figure 1:
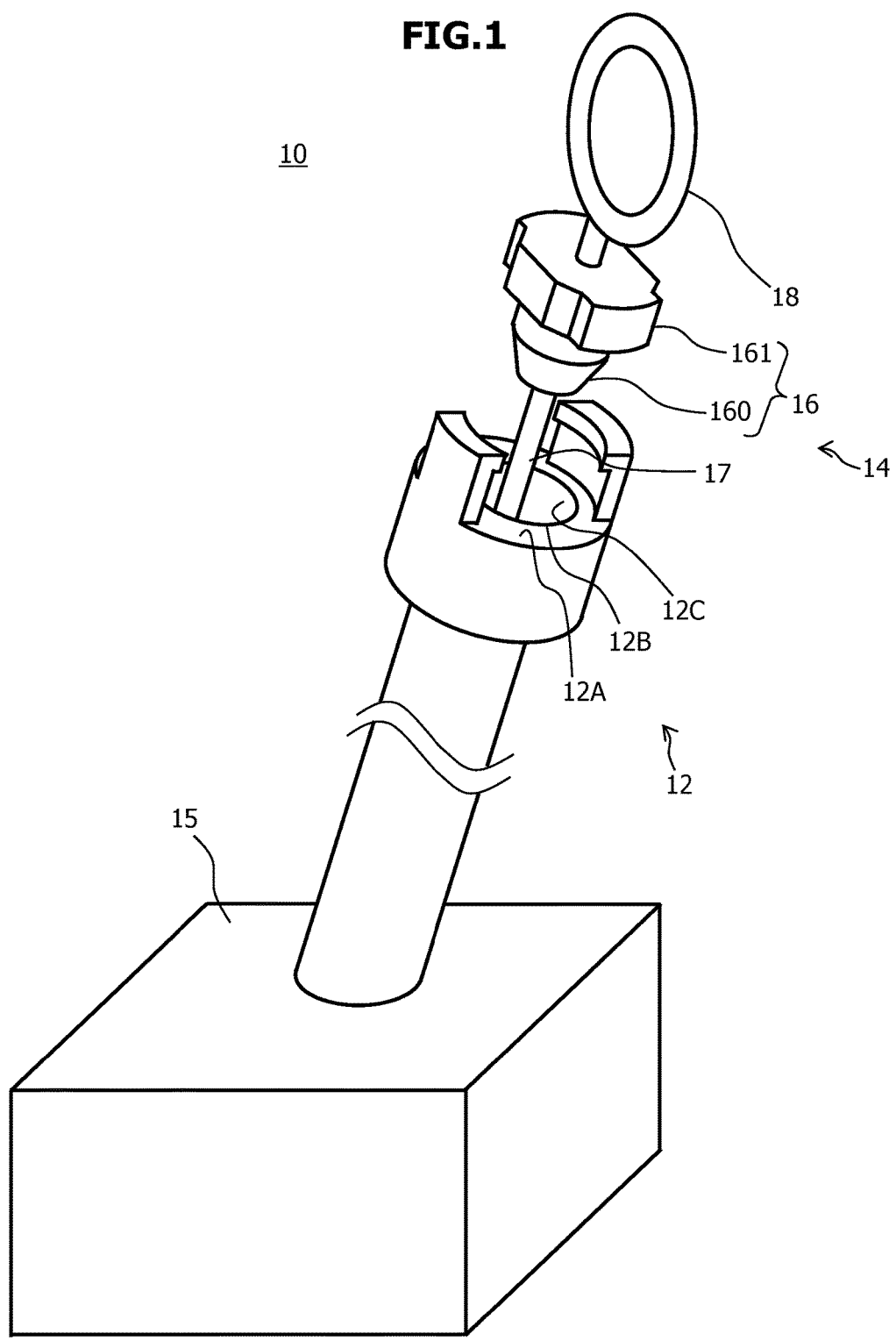
FIG. 1 is a perspective view of an oil level gauge device according to a first embodiment.

FIG. 1 illustrates a first embodiment of an oil level gauge device for use in a vehicle.

The oil level gauge device 10 is equipped with a guide pipe 12 and an oil level gauge 14.

The guide pipe 12 has one end 12A having an opening 12B and the other end that communicates with a storage tank 15, such as an oil pan, for storing a lubricating and cooling oil for an engine and transmission, at a position below the opening 12B. For example, the guide pipe 12 is, for example, a cylindrical tube formed of synthetic resin, steel, or the like.

The oil level gauge 14 includes a cap 16 that blocks ventilation between the inside and outside of the storage tank 15 via the opening 12B by being mounted on one end portion (end portion on the end 12A side) of the guide pipe 12, and a bar-shaped or plate-shaped longitudinal member 17 extending from the cap 16 toward the storage tank 15 within the guide pipe 12. The tip of the longitudinal member 17 is provided with a gauge portion (not illustrated) that indicates the height of oil in the storage tank 15 by adhesion of the oil, in a state in which the cap 16 is mounted on one end portion of the guide pipe 12.

The cap 16 is provided with a hand grip portion 18 that configures a hand grip (e.g., annular) for inserting a finger thereinto or a hand grip (e.g., T-shape) for hooking a finger thereon. The hand grip portion 18 may be formed by performing bending work on a portion obtained by extending the longitudinal member 17 of the oil level gauge 14 and penetrating the cap 16.

As used herein, the term "lower" is assumed to mean a place or position closer to the storage tank 15 along the guide pipe 12 with respect to one serving as a reference. Likewise, the term "upper" is assumed to mean a place or position farther from the storage tank 15.

The cap 16 is equipped with: a plug 160 that is configured to fit on an inner peripheral surface 12C of the guide pipe 12 at one end portion thereof; and a plate-like flange 161 that is formed integrally with the plug 160 at the upper portion of the plug 160 and is configured to abut one end surface 12A of the guide pipe 12. The cap 16 is formed of, for example, an elastic body such as a hard rubber. The flange 161 side of the plug 160 is formed as a columnar body or a cylindrical body in which the flange 161 side thereof contacts closely to the inner peripheral surface 12C. Furthermore, the plug 160 is formed as a conical or truncated conical body diameter-shrunk toward the gauge portion to facilitate its fitting on the inner peripheral surface 12C. However, the plug 160 is not limited to such a shape, but may have any shape as long as the plug 160 fits on the inner peripheral surface 12C.

Figure 2A:
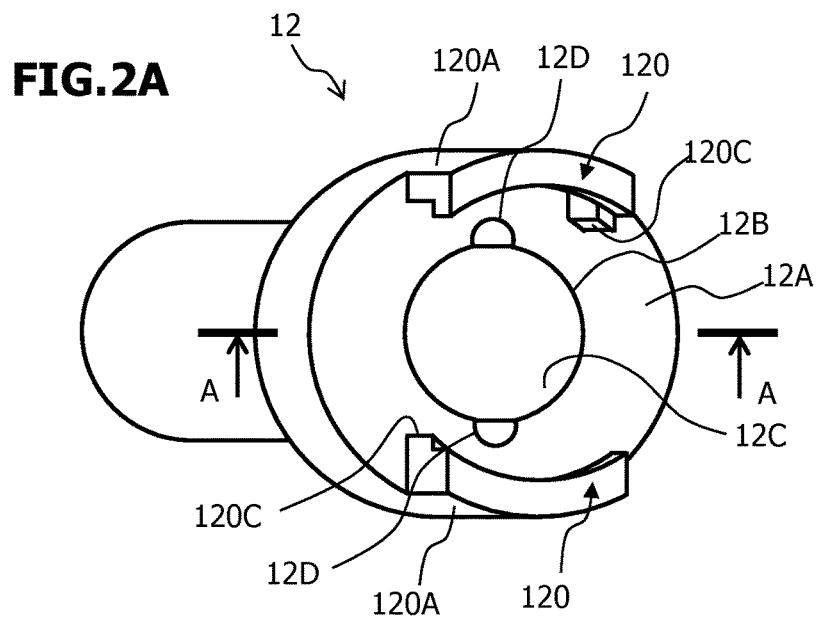
FIG. 2A illustrates the details of one end portion of a guide pipe, which is a perspective view as viewed from one end side.
Figure 2B:
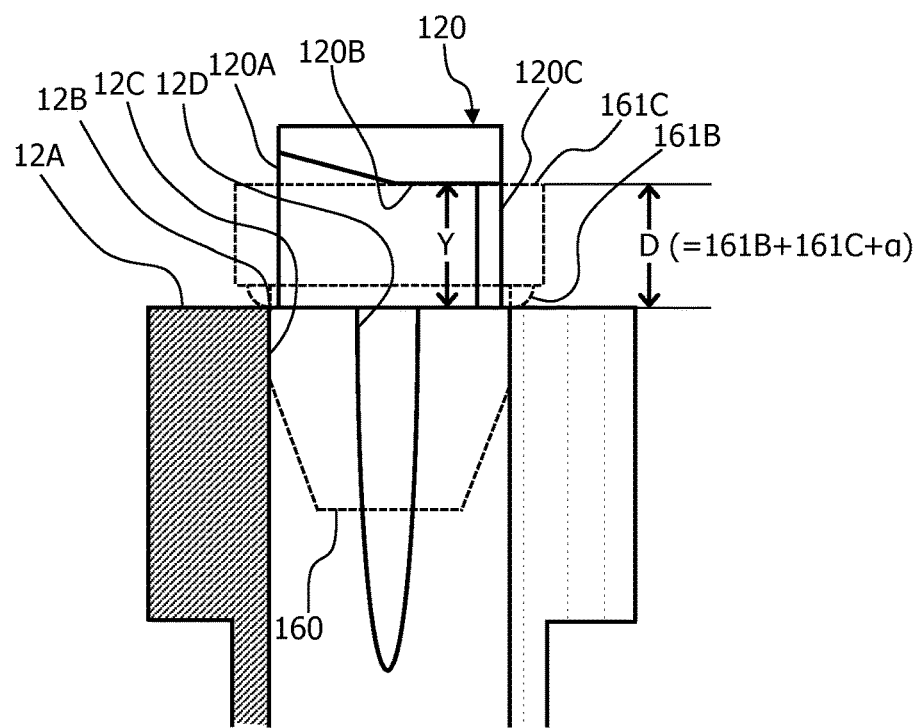
FIG. 2B illustrates the details of one end portion of a guide pipe, which is a sectional view taken along line A-A illustrated in FIG. 2A.

FIG. 2 illustrates the details of one end portion of the guide pipe 12, and FIG. 3 illustrates the details of the cap 16.

The inner peripheral surface 12C at the one end portion of the guide pipe 12 is provided with a groove 12D extending from a position below the lower end of the plug 160 in a state in which the plug 160 is fitted and the flange 161 abuts the end 12A, to an abutment surface of the end 12A abutting the flange 161. Multiple grooves 12D may be formed. Thus, when the plug 160 is fitted on the inner peripheral surface 12C at the one end portion of the guide pipe 12, and the flange 161 and the end 12A are not brought into abutment with each other, a ventilation passage that allows the inside and outside of the storage tank 15 to communicate via the opening 12B is formed between the plug 160 and the guide pipe 12. In addition to the groove 12D, a groove extending from the lower end of the plug 160 to the flange 161 may be further formed in the plug 160.

An abutment surface 161A of the flange 161 abutting the end 12A is formed with a convex portion 161B that is configured to fit in the groove 12D when the flange 161 and the end 12A abut each other. The fitting of the convex portion 161B in the groove 12D prevents a relative rotation between the oil level gauge 14 and the guide pipe 12 as one function. Furthermore, the flange 161 is provided with a protruding portion 161C protruding in the radial direction of the plug 160.

In the guide pipe 12, a separation member 120 separated from the end 12A is supported by a support portion 120A extending from the guide pipe 12. When the oil level gauge 14 is inserted into the guide pipe 12 in a state in which the position of the convex portion 161B and the position of the groove 12D are made to coincide with each other, when viewed in plan view, the separation member 120 interferes with the protruding portion 161C to prevent the fitting of the convex portion 161B in the groove 12D. The separation member 120 may be separated from the end 12A to the extent that it can prevent the plug 160 from being fitted into the guide pipe 12, in addition to the prevention of the fitting of the convex portion 161B in the groove 12D. On the other hand, when the oil level gauge 14 is inserted into the guide pipe 12 in a state in which the position of the convex portion 161B and the position of the groove 12D are not made to coincide with each other, when viewed in plan view, the separation member 120 is formed so that the separation member 120 does not interfere with the protruding portion 161C and allows the abutment of the convex portion 161B and the end 12A.

Furthermore, when the plug 160 is fitted into the guide pipe 12 and the convex portion 161B is in abutment on the end 12A, the separation member 120 is formed so as to guide the protruding portion 161C moving due to the rotation of the flange 161, between a lower surface 120B of the separation member 120 and the end 12A. In addition, the separation member 120 is provided with an abutment member 120C on which the protruding portion 161C moving between the lower surface 120B of the separation member 120 and the end 12A due to the rotation of the flange 161 abuts. The abutment member 120C is positioned in such a manner that the position of the convex portion 161B and the position of the groove 12D are made to coincide with each other when the protruding portion 161C abuts the abutment member 120C. With such a configuration of the separation member 120, the protruding portion 161C is guided until the position of the convex portion 161B and the position of the groove 12D coincide with each other.

A distance Y between the lower surface 120B of the separation member 120 and the end 12A is set to such a distance that the protruding portion 161C can move, and for example, is set to be a distance D from the upper surface of the protruding portion 161C to the end 12A in a state in which the convex portion 161B is in abutment with the end 12A. Alternatively, the distance Y is set to a distance that facilitates the movement of the protruding portion 161C and is obtained by adding a clearance a between the lower surface 120B and the protruding portion 161C to the distance D. When, however, the protruding portion 161C abuts the abutment member 120C, the distance Y may be set to be less than the distance D, e.g., the thickness between the upper end and lower end of the protruding portion 161C, at at least a part of the lower surface 120B facing the upper surface of the protruding portion 161C. However, the distance Y is such a distance that no damage is caused to the separation member 120, the convex portion 161B, or the like, when the protruding portion 161C is guided and moves between the separation member 120 and the end 12A. With the setting of the distance Y in this way, the protruding portion 161C and in its turn, the upper surface of the flange 161, are pressed by the lower surface 120B of the separation member 120. Therefore, even if the oil level gauge device 10 is vibrated due to the running of the vehicle or the like, looseness of the oil level gauge 14 is reduced and it is unlikely that the oil level gauge 14 will slip off from the guide pipe 12.

Furthermore, the lower surface 120B of the separation member 120 is inclined in such a manner that the protruding portion 161C can easily enter between the lower surface 120B of the separation member 120 and the end 12A by the rotation of the flange 161. For example, the distance Y is set so as to be greater than the distance D at an approach port of the protruding portion 161C and to gradually decrease toward the distance D as the protruding portion 161C moves.

Instead of the separation member 120, the protruding portion 161C may be guided using a structure similar to a Bayonet Neill-Concelman (BNC) connector. That is, in a state in which the plug 160 is fitted into the guide pipe 12, the protruding portion 161C may be fitted in a groove, a hole or a cutout portion spirally formed in the inner surface of the cylinder extending outward and in the axial direction from the guide pipe 12, thereby being guided from the tip of the cylinder to the end 12A.

Furthermore, when one end portion of the guide pipe 12 is formed in a flange fashion, a protruding portion similar to the protruding portion 161C may be provided instead of the separation member 120 provided on the guide pipe 12. This protruding portion may be guided by the separation member 120 provided in the flange 161 instead of the guide pipe 12, until the convex portion 161B and the groove 12D are fitted.

In short, the guide pipe 12 and the cap 16 may be formed in such a manner that when a relative rotation is made in the state in which the plug 160 is fitted on the inner peripheral surface 12C at one end portion of the guide pipe 12, the convex and concave portions provided in the surfaces of abutment between the end 12A and the flange 161 are fitted, so that the one end 12A and the flange 161 abut each other.

FIGS. 4 through 7 respectively illustrate processes up to the mounting of the cap 16 to one end portion of the guide pipe 12.

Figure 4A:
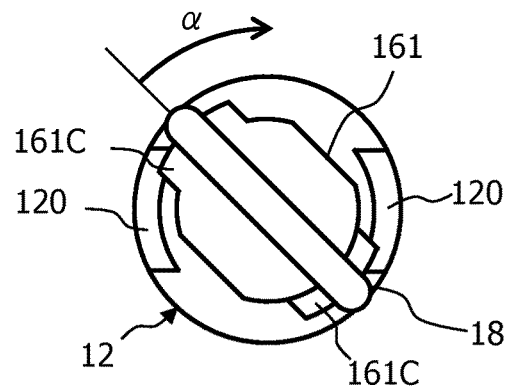
FIG. 4A illustrates a first mounting process, which is a plan view.
Figure 4B:
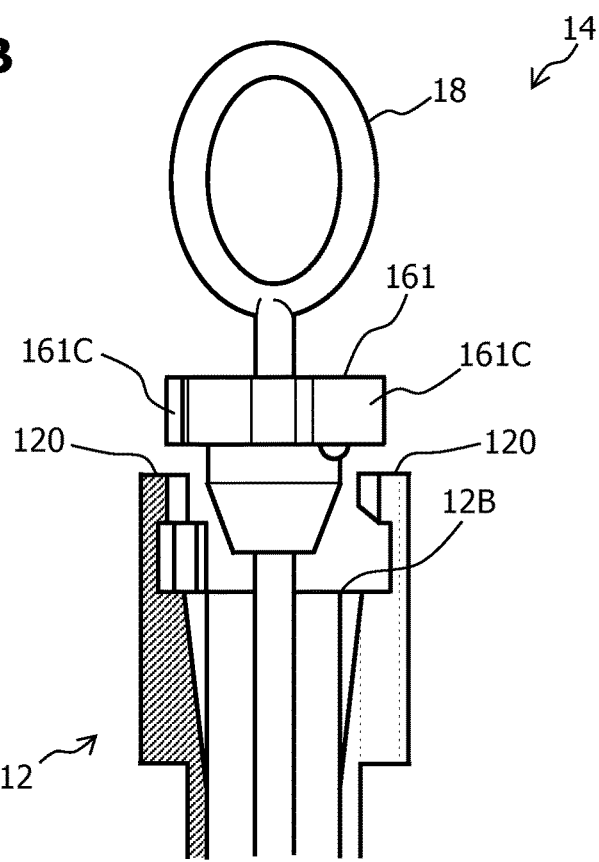
FIG. 4B illustrates a first mounting process, which is a partially sectional view in the axial direction.

First, as the first mounting process, as illustrated in FIG. 4, the gauge portion (not illustrated) of the oil level gauge 14 is inserted into the guide pipe 12 through the opening 12B. Then, when the oil level gauge 14 is moved (lowered) downward along the guide pipe 12, the cap 16 is rotated to an angular position in which the protruding portion 161C of the flange 161 does not interfere with the separation member 120 (direction indicated by arrow a in FIG. 4A).

Figure 5A:
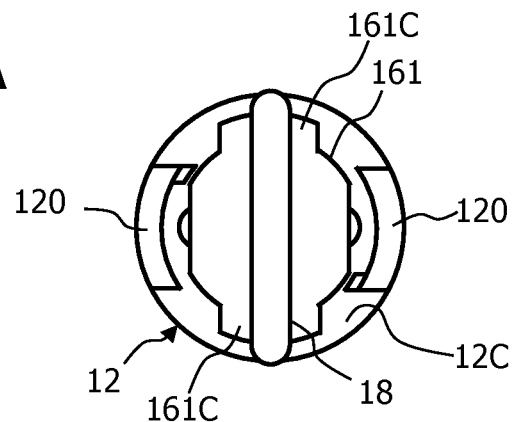
FIG. 5A illustrates a second mounting process, which is a plan view.
Figure 5B:
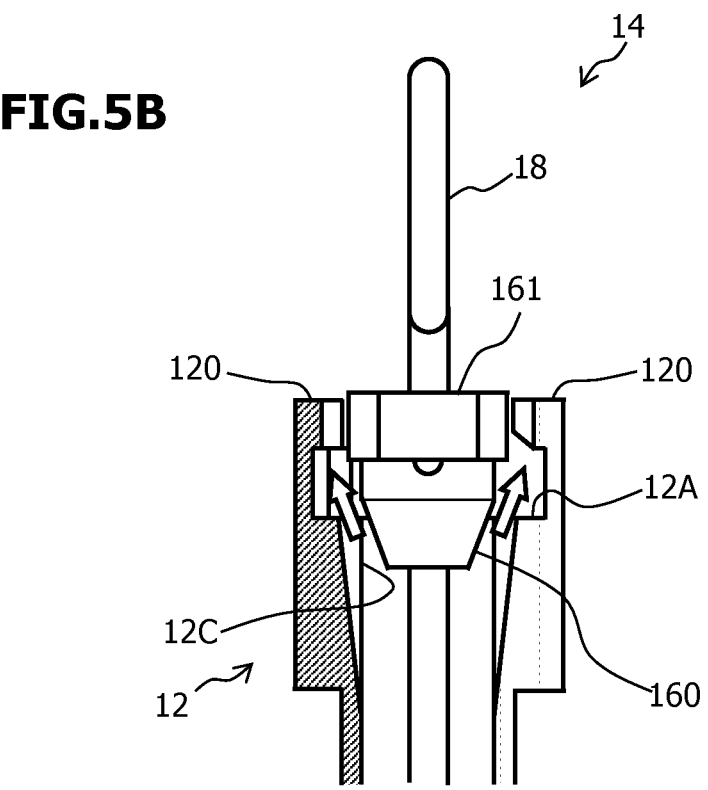
FIG. 5B illustrates a second mounting process, which is a partially sectional view in the axial direction.

Next, as the second mounting process, as illustrated in FIG. 5, the oil level gauge 14 is lowered in such a manner that the plug 160 is fitted on the inner peripheral surface 12C at the one end portion of the guide pipe 12. Furthermore, as the third mounting process, as illustrated in FIG. 6, the oil level gauge 14 is lowered until the convex portion 161B of the flange 161 is brought into abutment with the end 12A. Here, since the above-mentioned ventilation passage is formed between the plug 160 and the guide pipe 12 by the groove 12D, air in the guide pipe 12 compressed and removed by the fitting of the plug 160 is discharged into the atmosphere through the ventilation passage (nonsolid arrows in FIGS. 5 and 6).

Figure 6A:
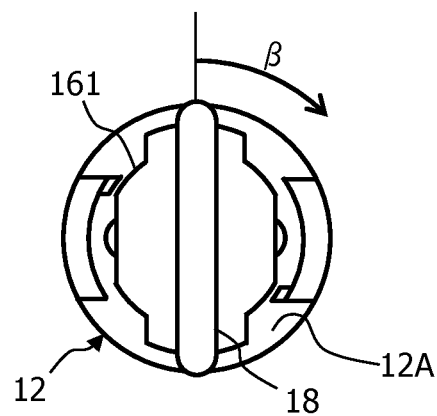
FIG. 6A illustrates a third mounting process, which is a plan view.
Figure 6B:
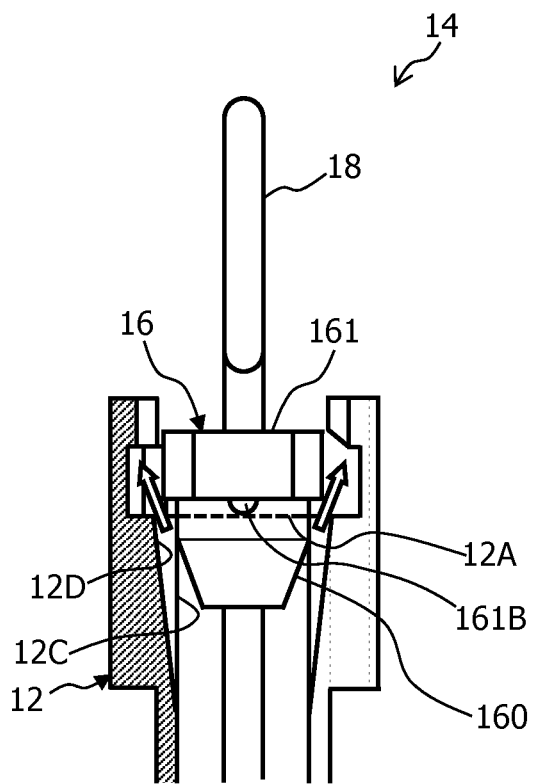
FIG. 6B illustrates a third mounting process, which is a partially sectional view in the axial direction.

Next, the convex portion 161B and the groove 12D are aligned from the state of FIG. 6, and the cap 16 is rotated by using the hand grip portion 18 or the like to bring the flange 161 and the end 12A into abutment with each other (direction indicated by arrow 13 in FIG. 6A). The direction of rotation thereof may be clearly indicated on the guide pipe 12 (e.g., open end face 12C) or the oil level gauge 14 (e.g., flange 161) by engraving, printing, molding, or the like, or by attaching a label with the rotational direction printed thereon. With the rotation of the cap 16, the protruding portion 161C enters between the separation member 120 and the end 12A.

Figure 7A:
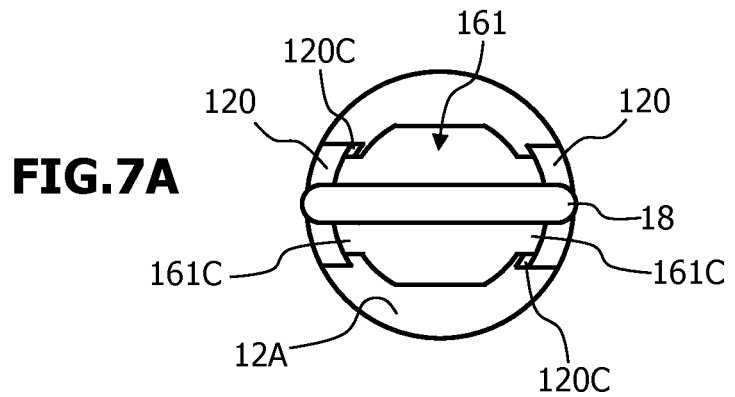
FIG. 7A illustrates a fourth mounting process, which is a plan view.
Figure 7B:
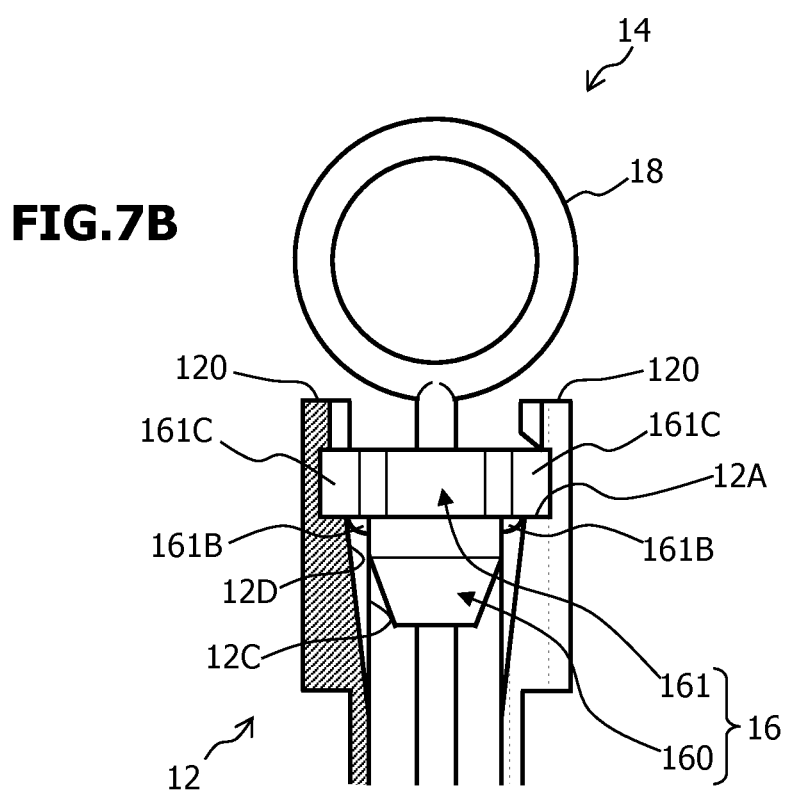
FIG. 7B illustrates a fourth mounting process, which is a partially sectional view in the axial direction.

Furthermore, in the fourth mounting process, as illustrated in FIG. 7, the cap 16 is pressed against the end 12A at the position in which the protruding portion 161C abuts the abutment member 120C. As described above, when the distance Y is set to be substantially identical to the vertical thickness of the flange 161 at at least a part of the lower surface 120B facing the upper surface of the protruding portion 161C when the protruding portion 161C abuts the abutment member 120C, the cap 16 is automatically pressed against the end 12A by the separation member 120 at the position in which the protruding portion 161C abuts the abutment member 120C. As described in the foregoing, when the convex portion 161B and the groove 12D are fitted, and the flange 161 and the end 12A are brought into abutment with each other, the mounting of the cap 16 onto the guide pipe 12 is completed. Furthermore, a lock for preventing the oil level gauge 14 from slipping off from the guide pipe 12 is completed. The above-described ventilation passage formed by the groove 12D is blocked by the fitting of the convex portion 161B and the groove 12D and the abutment of the flange 161 on the end 12A, so that ventilation between the inside and outside of the storage tank 15 via the opening 12B is cut off. The amount of oil stored in the storage tank 15 is measured in the state in which the cap 16 has been mounted (the same applies to the following).

According to such an oil level gauge device 10, the ventilation passage formed by the groove 12D is blocked at the time of completion of the mounting of the cap 16 to the guide pipe 12, i.e., completion of the fitting of the plug 160. Accordingly, air compressed and removed by the fitting of the plug 160 is made easy to be discharged to the outside, and air in the guide pipe 12 is made difficult to be compressed. Therefore, since the surface of the oil stored in the storage tank 15 is made difficult to push down, it is possible to accurately measure the amount of the oil.

Furthermore, according to the oil level gauge device 10, it is configured in such a manner that the convex portion 161B configured to fit in the groove 12D when the flange 161 abuts the end 12A, is formed on the abutment surface 161A of the flange 161, and the flange 161 and the end 12A are not brought into abutment unless the alignment between the groove 12D and the convex portion 161B is performed. Accordingly, the probability that the plug 160 is actively fitted on the inner peripheral surface 12C of the guide pipe 12 so that the ventilation passage is blocked before the air in the guide pipe 12 compressed and removed by the plug 160 is sufficiently discharged through the ventilation passage, can be reduced.

Although the present embodiment is configured to bring the flange 161 and the end 12A into abutment with each other by the fitting of the convex portion 161B and the groove 12D, a concave portion different from the groove 12D may be provided at the end 12A, and the flange 161 and the end 12A may be abutted together by the fitting of this concave portion and the convex portion 161B. In this case, the ventilation passage is blocked only by the abutment between the end 12A and the flange 161. Furthermore, the end 12A and the flange 161 may be configured to abut with each other by providing the convex portion at the end 12A, providing the concave portion at the flange 161 and fitting these convex and concave portions.

FIG. 8 illustrates an oil level gauge device 20 according to a second embodiment. The same configurations as in the first embodiment are denoted by the same reference numerals and their descriptions will therefore be omitted or simplified.

A plug 162 is, for example, an elastic body such as a hard rubber, and is formed by coaxially coupling two cylindrical cylinders of which the lower parts are respectively formed in a truncated conical-shape. There is an effect that when the plug 162 of such a shape is fitted in a guide pipe 12, an oil level gauge 14 is made difficult to slip off from the guide pipe 12.

Furthermore, a groove 162A extending from the lower end of the plug 162 to a flange 161 is formed in an outer peripheral surface of the plug 162. Multiple grooves 162A may be formed.

A concave portion 12E configured to fit on a convex portion 161B of the flange 161 when the flange 161 and the end 12A abut each other, is formed in an abutment surface of one end 12A of the guide pipe 12, on which the flange 161 abuts. The concave portion 12E may be one notched from an outer peripheral surface of the guide pipe 12 to an inner peripheral surface thereof.

In the present embodiment, unlike the first embodiment, no guiding mechanism including the separation member 120 and guiding the protruding portion 161C, is provided.

FIG. 9 illustrates a state in which the oil level gauge 14 is inserted into the guide pipe 12 and a cap 16 is lowered until the convex portion 161B of the flange 161 is brought into abutment with the end 12A.

When the plug 162 is fitted on the inner peripheral surface 12C at one end portion of the guide pipe 12, and the flange 161 and the end 12A are not brought into abutment with each other, a ventilation passage that allows the inside and outside of a storage tank 15 to communicate via an opening 12B by the groove 162A is formed between the plug 162 and the guide pipe 12. Air in the guide pipe 12 compressed and removed by the fitting of the plug 162 is discharged into the atmosphere through the ventilation passage (nonsolid arrows in FIG. 9).

Then, when the cap 16 is rotated in the state in which the convex portion 161B is brought into abutment with the end 12A, as illustrated in FIG. 10, the convex portion 161B and the concave portion 12E are fitted so that the flange 161 and the end 12A are abutted with each other. Thus, the mounting of the cap 16 to the guide pipe 12 is completed. The above-described ventilation passage formed by the groove 162A is blocked by the abutment between the flange 161 and the end 12A, so that ventilation between the inside and outside of the storage tank 15 is cut off.

According to the oil level gauge device 20 of the second embodiment, the ventilation passage formed by the groove 162A is blocked at the time of completion of fitting of the plug 162 in the guide pipe 12. Accordingly, as with the first embodiment, air compressed and removed by the fitting of the plug 162 is made easy to be discharged to the outside before the ventilation passage is blocked, and air in the guide pipe 12 is made difficult to be compressed. Therefore, since the surface of the oil stored in the storage tank 15 is made difficult to push down, it is possible to accurately measure the amount of the oil.

Furthermore, according to the oil level gauge device 20, it is configured in such a manner that the flange 161 and the end 12A do not abut each other unless the alignment between the convex portion 161B and the concave portion 12E is performed. Therefore, when the cap 16 is lowered toward the end 12A to insert the oil level gauge 14 into the guide pipe 12, the probability of blocking the ventilation passage immediately is not as low as in the first embodiment, but is lower than in a case in which the convex portion 161B and the concave portion 12E are not provided. Thus, even in the case of the simple configuration in which no separation member 120 in the first embodiment is provided, the probability that the ventilation passage will be blocked by the plug 162 being actively fitted in the guide pipe 12, before the air in the guide pipe 12 compressed and removed by the plug 162 is sufficiently discharged via the ventilation passage, can be reduced.

Figure 11A:
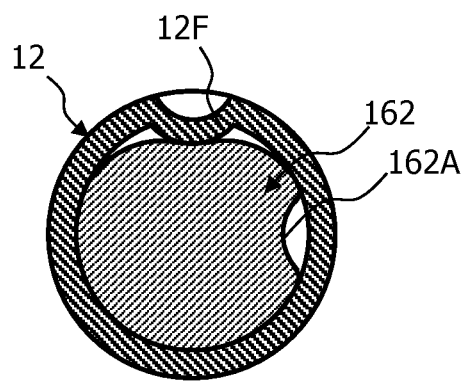
FIG. 11A illustrates a modification of the oil level gauge device according to the second embodiment, which is a sectional view taken along line B-B of FIG. 9.
Figure 11B:
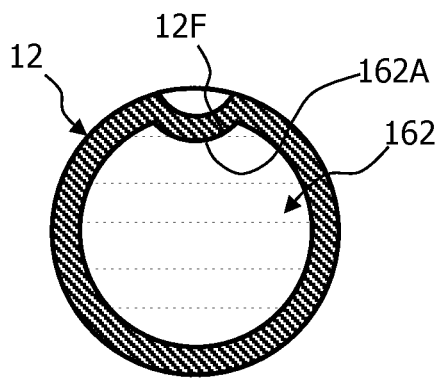
FIG. 11B illustrates a modification of the oil level gauge device according to the second embodiment, which is a sectional view illustrating a state in which a plug is rotated in FIG. 11A.

In the second embodiment, when the flange 161 and the end 12A are in abutment with each other, an inwardly-expanding expansion portion 12F may be formed on the inner peripheral surface of the guide pipe 12 as illustrated in FIG. 11B and fitted in the groove 162A. Thus, the effect of preventing the relative rotation between the oil level gauge 14 and the guide pipe 12 can be improved, and a sealing property by the mounting of the cap 16 can also be improved. When the flange 161 and the end 12A do not abut each other, as illustrated in FIG. 11A, the plug 162 is pressed by the expansion portion 12F, thereby being elastically deformed. In the vicinity of the expansion portion 12F, a space is formed between the plug 162 and the guide pipe 12. The space can be used as a ventilation passage enabling air in the guide pipe 12 compressed and removed by the plug 162 to be discharged to the outside more rapidly.

Furthermore, in the second embodiment, the end 12A and the flange 161 may be configured to abut each other by providing the convex portion at the end 12A, providing the concave portion at the flange 161 and fitting these convex and concave portions.

Figure 12:
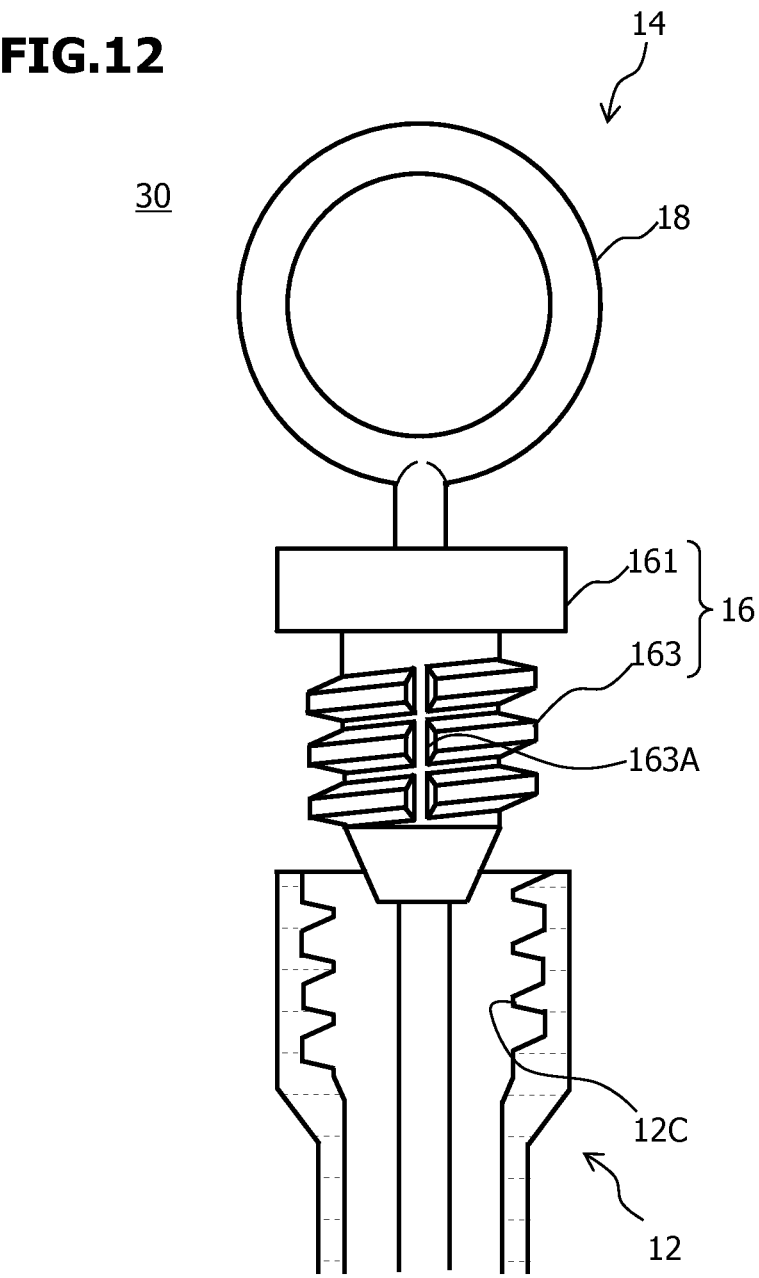
FIG. 12 is an axial partially sectional view of an oil level gauge device according to a third embodiment.

FIG. 12 illustrates an oil level gauge device 30 according to a third embodiment. The same configurations as in the first embodiment are denoted by the same reference numerals and their description will therefore be omitted or simplified.

A guide pipe 12 and a plug 163 are formed in such a manner that the plug 163 is threadedly engaged with and fitted on an inner peripheral surface 12C at one end portion of the guide pipe 12.

Furthermore, in a threading portion in which the plug 163 and the inner peripheral surface 12C at the end portion of the guide pipe 12 are threadedly engaged with each other, an outer peripheral surface of the plug 163 is formed with a groove 163A extending over its overall length in a threading direction. Multiple grooves 163A may be formed. Also, when the accuracy of threading of the plug 163 and the guide pipe 12 is high, the groove 163A may be formed deeper than the valley of the threading portion to form a ventilation passage. Furthermore, instead of the groove 163A, or in addition to the groove 163A, the inner peripheral surface 12C in the threading portion may be formed with a groove extending over its overall length in the threading direction.

In the present embodiment, unlike in the first embodiment, neither the guiding mechanism of the protruding portion 161C by the separation member 120, nor the convex portion 161B is provided.

FIG. 13 illustrates a state in which the plug 163 and the guide pipe 12 are being threadedly engaged with each other.

When a cap 16 is rotated by using a hand grip portion 18, the plug 163 is gradually fitted into the guide pipe 12. When a flange 161 and one end 12A do not abut each other, a ventilation passage that allows the inside and outside of a storage tank 15 to communicate via an opening 12B is formed between the guide pipe 12 and the plug 163 by the groove 163A. Air in the guide pipe 12 compressed and removed by the fitting of the plug 163 is discharged into the atmosphere by the ventilation passage (nonsolid arrows in FIG. 13).

Then, when the cap 16 is further rotated, the flange 161 and the end 12A are brought into abutment with each other as illustrated in FIG. 14. Thus, the mounting of the cap 16 onto the guide pipe 12 is completed. The ventilation passage formed by the groove 163A is blocked by the abutment between the flange 161 and the end 12A, so that ventilation between the inside and outside of the storage tank 15 is cut off.

According to the oil level gauge device 30 of the third embodiment, the ventilation passage formed by the groove 163A is blocked at the time of completion of the fitting of the plug 163 in the guide pipe 12. Thus, as with the first embodiment, the air compressed and removed by the fitting of the plug 163 is made easy to be discharged to the outside before the ventilation passage is blocked, and the air in the guide pipe 12 is made difficult to be compressed. Therefore, since the surface of oil stored in the storage tank 15 is made difficult to push down, it is possible to accurately measure the amount of the oil.

Furthermore, according to the oil level gauge device 30, since the plug 163 is threadedly engaged with and fitted in the guide pipe 12, it is difficult to consider that the plug 163 is actively fitted in the guide pipe 12. Accordingly, there is no concern that the ventilation passage is blocked before the air in the guide pipe 12 compressed and removed by the plug 163 is sufficiently discharged through the ventilation passage.

In the above-described first and second embodiments, when it is not necessary to allow the cap 16 to rotate relative to the guide pipe 12 as in a case in which, for example, when it is desired to allow the oil level gauge devices 10 and 20 to have the function of simply discharging the air compressed and removed by the fitting of the plug 160 to the outside through the ventilation passage, the guide pipe 12 may be one formed into a prismatic tubular shape other than the cylindrical tube.

Furthermore, in the first embodiment, a groove extending from the lower end of the plug 160 to the flange 161 may be formed in the outer peripheral surface of the plug 160 as with the groove 162A of the second embodiment without providing the groove 12D in the guide pipe 12. In this case, a concave portion configured to fit on the convex portion 161B is formed in the end 12A. The concave portion is positioned so as to coincide with the position of the convex portion 161B when the protruding portion 161C is guided between the separation member 120 and the end 12A and abuts the abutment member 120C. Even such a configuration brings about an effect similar to that in the first embodiment.

Furthermore, the configurations of the respective embodiments in the present specification can appropriately be combined as long as no conflict occurs.

According to the priority claim based on Japanese Patent Application No. 2012-277470, filed on Dec. 19, 2012, the entire content thereof is incorporated herein by reference.

In addition, the selected embodiments are merely selected for illustrations or description of the present invention, and it is obvious to one skilled in the art from the present disclosure that it is possible to carry out various changes and modifications without departing from the scope of the present invention as defined in the appended claims.

Furthermore, the aforementioned description of the embodiments according to the present invention are provided only for illustrations and are not for limiting the present invention (the invention as claimed in the appended claims, and equivalents thereof).

What is claimed is:

1. An oil level gauge device comprising:
    a cylindrical tube-like guide pipe having one end provided with an opening and the other end being in communication with an oil pan; and
    an oil level gauge configured to be inserted in the guide pipe,
    wherein a cap comprising: a plug configured to fit on an inner peripheral surface of the guide pipe at one end portion thereof, which is an end portion on the one end side; and a flange that is integrally formed with the plug on the side opposite to the oil pan side of the plug fitted thereon and that is configured to axially abut an open end surface at the one end, is provided at a base end of the oil level gauge, and
    wherein when the plug is fitted on the inner peripheral surface at the one end portion of the guide pipe and the flange is not brought into abutment with the open end surface, a ventilation passage for communicating the inside and outside of the oil pan through the opening is formed between the plug and the guide pipe,
    wherein the ventilation passage is formed by a groove formed in the inner peripheral surface at the one end portion of the guide pipe and extending from a deeply inserted side of the plug to an abutment surface of the one end, the abutment surface abutting the flange,
    wherein concave and convex portions configured to fit when the flange and the one end abut each other, are formed in abutment surfaces of the flange and the one end.

2. The oil level gauge device according to claim 1, wherein the guide pipe and the cap are formed in such a manner that when a relative rotation between the guide pipe and the cap is made in a state in which the plug is fitted on the inner peripheral surface at the one end portion of the guide pipe, the convex and concave portions are fitted, so that the open end surface and the flange abut each other.

3. The oil level gauge device according to claim 2, wherein the flange is provided with a protruding portion protruding in a radial direction of the plug, and
    wherein the guide pipe is formed with a member that guides the protruding portion moving due to the rotation of the cap until the position of the convex portion and the position of the concave portion coincide with each other.

4. The oil level gauge device according to claim 3, wherein the member is formed in such a manner as to, when the oil level gauge is inserted in the guide pipe, interfere with the protruding portion in a state in which the position of the convex portion and the position of the concave portion coincide with each other when viewed in plan view, and not to interfere with the protruding portion in a state in which the position of the convex portion and the position of the concave portion do not coincide with each other when viewed in plan view.

5. The oil level gauge device according to claim 4, wherein when the convex portion and the concave portion are fitted and the open end surface and the flange abut each other, the member presses the flange toward the open end surface.

6. The oil level gauge device according to claim 2, wherein when the convex portion is provided on the abutment surface of the flange, the concave portion is formed by the groove.

7. The oil level gauge device according to claim 3, wherein when the convex portion is provided on the abutment surface of the flange, the concave portion is formed by the groove.

8. The oil level gauge device according to claim 4, wherein when the convex portion is provided on the abutment surface of the flange, the concave portion is formed by the groove.

9. The oil level gauge device according to claim 5, wherein when the convex portion is provided on the abutment surface of the flange, the concave portion is formed by the groove.

10. The oil level gauge device according to claim 1, wherein when the convex portion is provided on the abutment surface of the flange, the concave portion is formed by the groove.

11. An oil level gauge device comprising:
a cylindrical tube-like guide pipe having one end provided with an opening and the other end being in communication with an oil pan; and
an oil level gauge configured to be inserted in the guide pipe,
wherein a cap comprising: a plug configured to fit on an inner peripheral surface of the guide pipe at one end portion thereof, which is an end portion on the one end side; and a flange that is integrally formed with the plug on the side opposite to the oil pan side of the plug fitted thereon and that is configured to axially abut an open end surface at the one end, is provided at a base end of the oil level gauge, and
wherein when the plug is fitted on the inner peripheral surface at the one end portion of the guide pipe and the flange is not brought into abutment with the open end surface, a ventilation passage for communicating the inside and outside of the oil pan through the opening is formed between the plug and the guide pipe,
wherein the ventilation passage is formed by a groove formed in an outer peripheral surface of the plug and extending in an axial direction of the plug,
wherein convex and concave portions fitted when the flange and the open end surface abut each other are formed in abutment surfaces of the flange and the open end surface.

12. The oil level gauge device according to claim 11, wherein an inwardly-expanding expansion portion is formed on the inner peripheral surface of the guide pipe, so as to be fitted in the groove when the flange and the one end abut each other.

13. An oil level gauge device comprising:
a cylindrical tube-like guide pipe having one end provided with an opening and the other end being in communication with an oil pan; and
an oil level gauge configured to be inserted in the guide pipe,
wherein a cap comprising: a plug configured to fit on an inner peripheral surface of the guide pipe at one end portion thereof, which is an end portion on the one end side; and a flange that is integrally formed with the plug on the side opposite to the oil pan side of the plug fitted thereon and that is configured to axially abut an open end surface at the one end, is provided at a base end of the oil level gauge, and
wherein when the plug is fitted on the inner peripheral surface at the one end portion of the guide pipe and the flange is not brought into abutment with the open end surface, a ventilation passage for communicating the inside and outside of the oil pan through the opening is formed between the plug and the guide pipe,
wherein the guide pipe and the plug are formed in such a manner that the plug is threadedly engaged with and fitted on the inner peripheral surface at the one end portion of the guide pipe,
wherein the ventilation passage formed by a groove extending in a threading direction over the overall length of a threading portion in which the plug and the guide pipe are threadedly engaged with each other is formed in at least one of the plug and the guide pipe.

14. The oil level gauge device according to claim 13, wherein the groove is formed deeper than a valley of a threaded groove at the threading portion.

* * * * *